United States Patent
Warren

(10) Patent No.: US 6,244,633 B1
(45) Date of Patent: Jun. 12, 2001

(54) SELF-SEALING COLLAR FOR USE IN HEATING AND AIR CONDITIONING SYSTEMS

(75) Inventor: George E. Warren, Concord, CA (US)

(73) Assignee: Sheet Metal Specialists, Inc., Concord, CA (US)

( * ) Notice: Subject to any disclaimer, the term of this patent is extended or adjusted under 35 U.S.C. 154(b) by 0 days.

(21) Appl. No.: 09/473,905

(22) Filed: Dec. 28, 1999

Related U.S. Application Data

(60) Provisional application No. 60/122,773, filed on Mar. 3, 1999.

(51) Int. Cl.[7] ............................................. F16L 41/00
(52) U.S. Cl. ..................... 285/424; 285/141.1; 285/222; 285/214
(58) Field of Search .................... 285/424, 179.2, 285/141, 1, 214, 222

(56) References Cited

U.S. PATENT DOCUMENTS

| | | | |
|---|---|---|---|
| 216,991 | * | 7/1879 | Abbott .................................. 285/424 |
| 925,033 | * | 6/1909 | Sappenfield .......................... 285/424 |
| 1,455,027 | * | 5/1923 | Ludwig ................................. 285/424 |
| 1,798,121 | * | 3/1931 | Jackes et al. ........................ 285/424 |
| 1,808,450 | * | 6/1931 | burgess ................................ 285/424 |
| 2,880,017 | * | 3/1959 | Anderson et al. .................... 285/424 |
| 3,361,147 | * | 1/1968 | Timmons ............................. 285/424 |
| 3,606,404 | * | 9/1971 | McGann .............................. 285/424 |
| 4,620,729 | * | 11/1986 | Kauffman ............................ 285/424 |
| 5,393,106 | * | 2/1995 | Schroeder ........................... 285/424 |

FOREIGN PATENT DOCUMENTS

| 2346080 | * | 3/1975 | (DE) ..................................... 285/424 |
|---|---|---|---|

\* cited by examiner

*Primary Examiner*—Eric K. Nicholson
(74) *Attorney, Agent, or Firm*—Calvin B. Ward

(57) ABSTRACT

A collar for connecting a duct to a wall having a hole therein bounded by an edge having a predetermined thickness. The collar is constructed from a sheet of material having top, bottom, left and right edges, the sheet forming a tubular structure in which the left and right edges overlap. The sheet includes a groove for engaging the edge of the hole. The sheet also includes first and second detents spaced apart thereon. The overlap of the left and right edges at the top edge changes when the spacing between the first and second detents is changed. The collar also includes a first fastener for fixing the overlap of the left and right edges at the top edge when the edge of the hole is engaged in the groove and a second fastener for fixing the overlap of the left and right edges at the bottom edge. In the preferred embodiment of the present invention, the groove includes a layer of a sealing material for forming a seal between the sheet of material and the edge of the hole. The collar is shipped with a removable cover strip over the groove for protecting the layer of sealing material. A ridge for forming a seal with the duct when the duct is installed over the collar may also be included in the sheet.

9 Claims, 5 Drawing Sheets

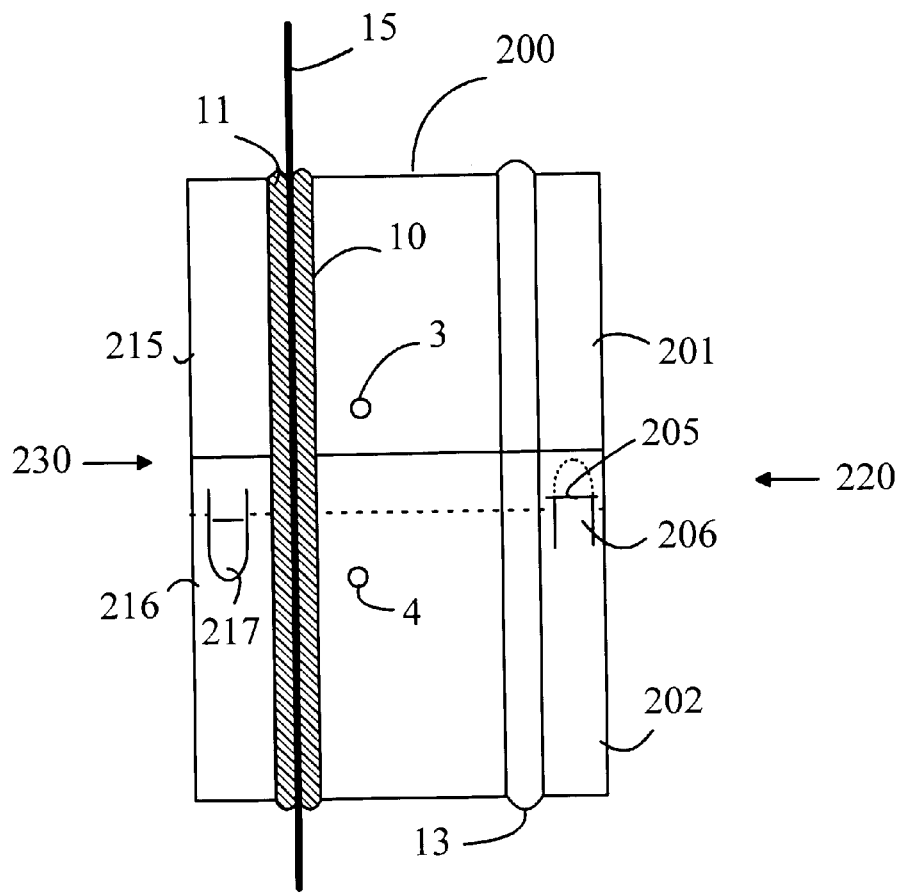
FIGURE 9
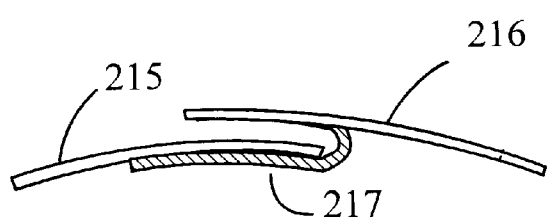
FIGURE 11
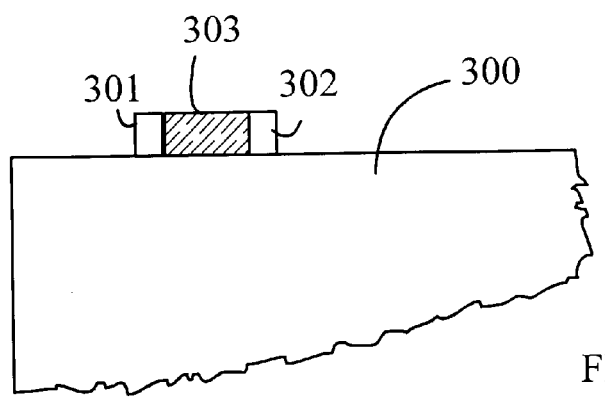
FIGURE 10
FIGURE 12

SELF-SEALING COLLAR FOR USE IN HEATING AND AIR CONDITIONING SYSTEMS

This application claims the benefit of Provisional No. 60/122,773 filed Mar. 3, 1999.

FIELD OF THE INVENTON

This invention relates to fittings for ducts of the type used in heating and air conditioning, and more particularly relates to a self-sealing collar for connecting ducting to other fittings such as air supplies, returns and plenums.

BACKGROUND OF THE INVENTION

Modern heating and air systems are constructed from steel and flexible ducting that are connected to various plenums, inlets, and outlet fittings. The fittings and plenums are sheet metal structures having a circular hole for receiving a duct collar that is used to connect the flexible ducting to the fitting. The collars must provide a secure, airtight connection between the ducting and the sheet metal. This is particularly important in the systems that use high pressure and/or high velocity air. In addition, starting collars must be inexpensive, both in terms of the cost of the collar and in terms of the installation time needed to install the collar.

The problem of providing a secure, airtight seal is complicated by the fact that the hole in the plenum into which the collar is inserted is often cut in the field, and hence, may vary in size and shape from design specifications. This lack of precision makes it difficult to provide a rigid, secure fitting between the collar and the plenum. In addition, the collar must be sealed with duct tape or caulk to prevent air leakage around the collar. If the collar is not securely attached to the plenum wall, the duct tape seal will eventually fail due to the vibration of the collar induced by airflow through the plenum.

One class of prior art starting collar utilizes tabs to connect the collar to the plenum. These collars require the installer to bend a number of tabs that are cut into the inserting surface of the starting collar to secure the collar to the duct plenum hole. The installer must bend every fourth tab to the outside and the rest to the inside of the cut plenum hole. This type of installation is time consuming. In addition, the seal between the collar and the plenum hole leaks air because the plenum holes typically vary both in size and shape. As a result, the final assembly must be sealed manually with duct tape or caulk. Installation of the duct tape substantially increases the installation time, and hence, the cost of the installation. In addition, the tabs do not provide a secure fit if the hole is too large or oblong in shape. Hence, vibration will, over time, cause the tape seal to fail.

Collar configurations that utilize some form of flange and sheet metal screws for attachment are also known to the art. Once again, to provide an air tight seal, some form of caulking or duct tape must be used to seal the final assembly. In addition, the time needed to screw in several sheet metal screws increases the installation time.

Broadly, it is the object of the present invention to provide an improved collar for making connections between ducting and sheet metal structures.

It is another object of the present invention to provide a collar that provides a tight seal even when the hole to which it mates differs significantly from the design specifications.

It is yet another object of the present invention to provide a collar that provides an airtight seal.

It is still another object of the present invention to provide a collar that can be quickly and easily installed.

These and other objects of the present invention will become apparent to those skilled in the art from the following detailed description of the invention and the accompanying drawings.

SUMMARY OF THE INVENTION

The present invention is a collar for connecting a duct to a wall having a hole therein bounded by an edge having a predetermined thickness. The collar is constructed from a sheet of material having top, bottom, left and right edges, the sheet forming a tubular structure in which the left and right edges overlap. The sheet includes a groove for engaging the edge of the hole. The sheet also includes first and second detents spaced apart thereon. The overlap of the left and right edges at the top edge changes when the spacing between the first and second detents is changed. The collar also includes a first fastener for fixing the overlap of the left and right edges at the top edge when the edge of the hole is engaged in the groove and a second fastener for fixing the overlap of the left and right edges at the bottom edge. In the preferred embodiment of the present invention, the groove includes a layer of sealing material for forming a seal between the sheet of material and the edge of the hole. The collar is shipped with a removable cover strip over the groove for protecting the layer of sealing material. A ridge for forming a seal with the duct when the duct is installed over the collar may also be included in the sheet.

BRIEF DESCRIPTION OF THE DRAWINGS

FIG. 9 is a side view of another embodiment of a collar 200 according to the present invention.

FIG. 10 is an end view of a portion of collar 200 in the direction shown by arrow 220.

FIG. 11 is an end view of a portion of collar 200 in the direction shown by arrow 230.

FIG. 12 is a cross-sectional view of a portion of a collar 300 according to another embodiment of the present invention.

DETAILED DESCRIPTION OF THE INVENTION

Figure 1:
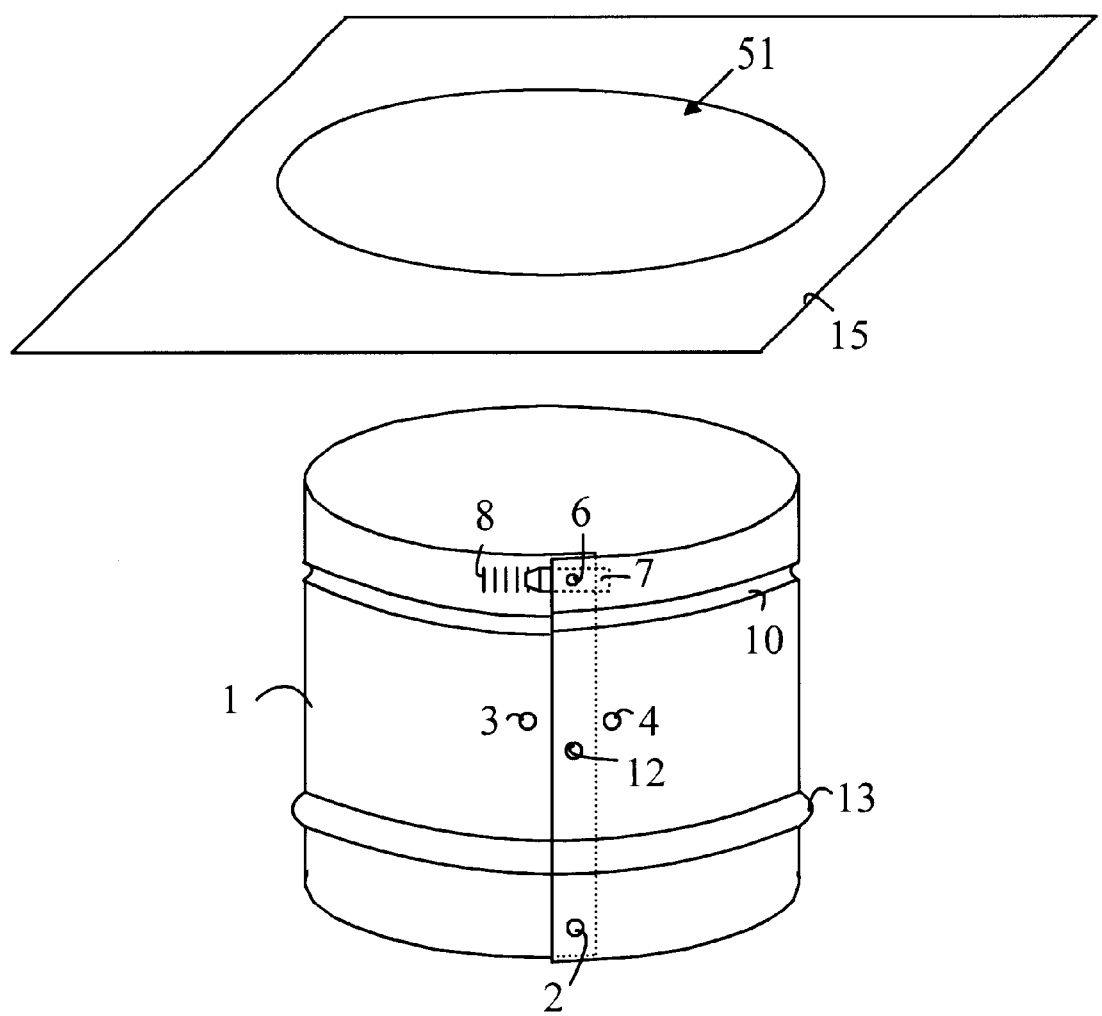
FIG. 1 is a prospective view of a collar 1 according to the present invention

The manner in which the present invention provides its advantages may be more easily understood with reference to FIG. 1 which is a prospective view of a collar 1 according to the present invention. Collar 1 can be constructed by rolling a sheet of galvanized steel, steel, aluminum, copper, plastic and/or any other suitable material to form a tubular structure having an overlapping lip. Collar 1 can be collapsed and inserted in a hole 51 on the wall 15 of a plenum or similar structure by pressing on the outside of the collar so as to cause holes 3 and 4 to move closer to one another. A fastener 2 provides a pivot point so the diameter of collar 1 in the vicinity of boss 13 does not change substantially when the diameter of the end that is inserted in hole 51 is altered. Starting collar 1 can be held in the collapsed position by hand to facilitate the installation of collar 1 into wall 15. A groove 10 is provided to engage the edges of hole 51. In the preferred embodiment of the present invention groove 10 is filled with caulking material 11. To simplify the drawing, the caulking material has been omitted from FIG. 1.

Figure 2:
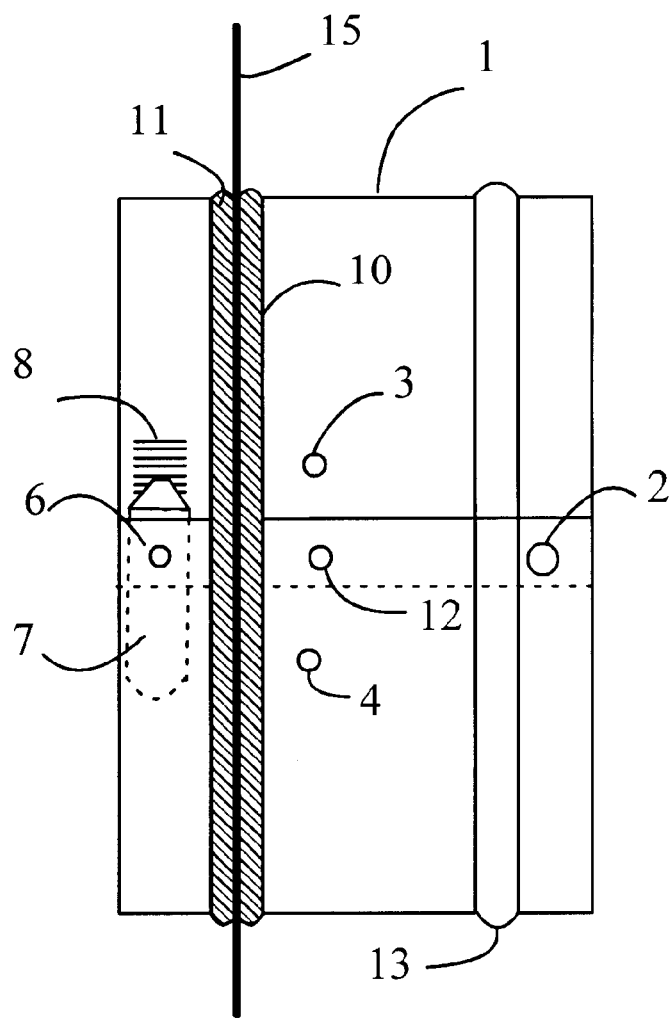
FIG. 2 is a side view of collar 1 after it has been expanded to engage wall 15.

Once collar 1 is properly positioned with respect to hole 15, the portion of collar 1 within hole 15 is expanded such that collar 1 engages wall 15 as shown in FIG. 2, which is a side view of collar 1 after collar 1 has been expanded to engage wall 15. To expand collar 1, a spreading tool (not shown) engages holes 3 and 4 so as to increase the distance between holes 3 and 4. Groove 10 with caulking material 11 bottoms out on the cut hole in wall 15. The sharp edge of hole 51 separates the caulking material and seals the hole from both sides, preventing any air leakage. In the preferred embodiment of the present invention, collar 1 is opened with sufficient expanding force to assure that the collar will not turn or move.

Figure 3:
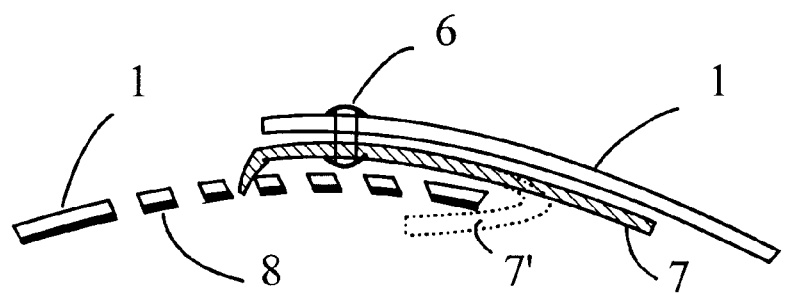
FIG. 3 is an expanded end view of a portion of collar 1 showing tab 7 in the bent back position.

As the starting collar 1 is being expanded by the expanding tool, the pointed end of a securing tab 7 is ratcheted across the slots 8 which provide a locking mechanism for holding collar 1 in the expanded state when the separating tool is removed. Tab 7 is preferably attached to collar 1 by a fastener 6. To further secure the collar, the securing tab 7 end is bent back on itself and locked as shown in FIG. 3, which is an expanded end view of a portion of collar 1 showing tab 7 in the bent back position at 7'. In the event the collar may require additional securing, a fastener may be inserted into a hole 12. While the above-described embodiment utilizes a slotted ratcheting mechanism, it will be obvious to those skilled in the art from the preceding discussion that there are numerous other ratcheting mechanisms that can be utilized. For example, the slots and tabs can be replaced by a series of hole and pin mechanisms.

Figure 4:
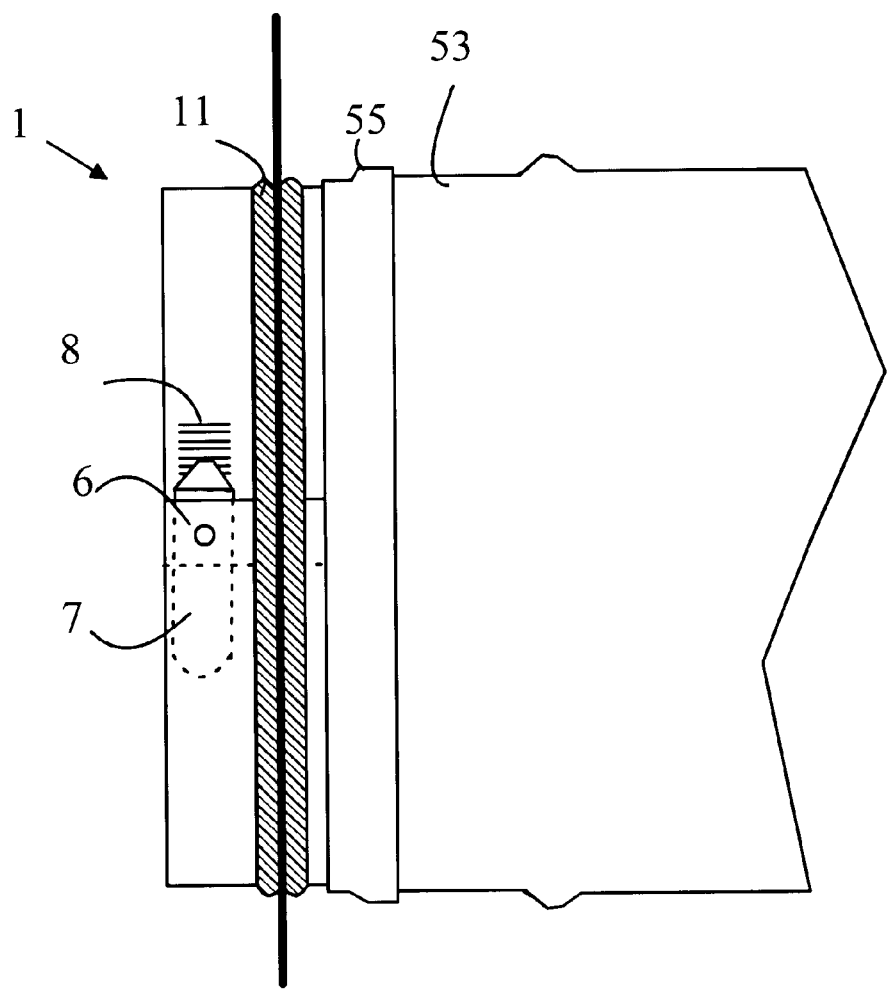
FIG. 4 is a side view of collar 1 with the duct work installed.

Refer now to FIG. 4 which is a side view of collar 1 with the duct work installed. The duct work 53 can slide onto collar 1 and be secured with a strap and tape 55, so that it is locked behind ridge 13. The installed duct work also seals the portion of the flap that is outside the plenum, thereby assuring that air does not leak through the flap.

Figure 5:
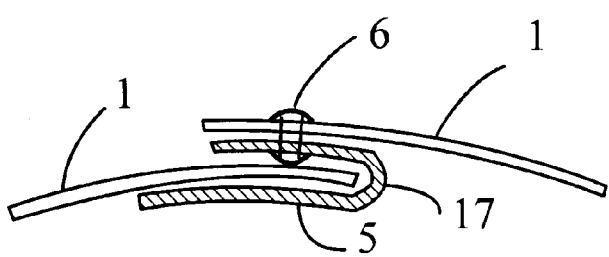
FIG. 5 is an expanded end view of a portion of collar 1 showing an alternative locking mechanism.

There are numerous alternative devices for locking starting collar 1 in the expanded position. Refer now to FIG. 5 which is an expanded end view of a portion of collar 1 showing an alternative locking mechanism. In this embodiment of the present invention, tabs 7 and slots 8 discussed above are replaced by a simple tab 5 that is attached to collar 1 by fastener 6. After collar 1 has been fully expanded in hole 51, tab 5 is bent around the edge 17 of the flap of collar 1 as shown in the figure.

Figure 6:
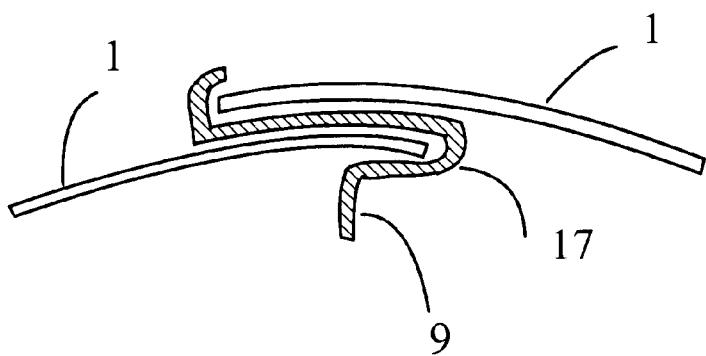
FIG. 6 is an expanded end view of a portion of collar 1 showing another alternative locking mechanism.
Figure 7:
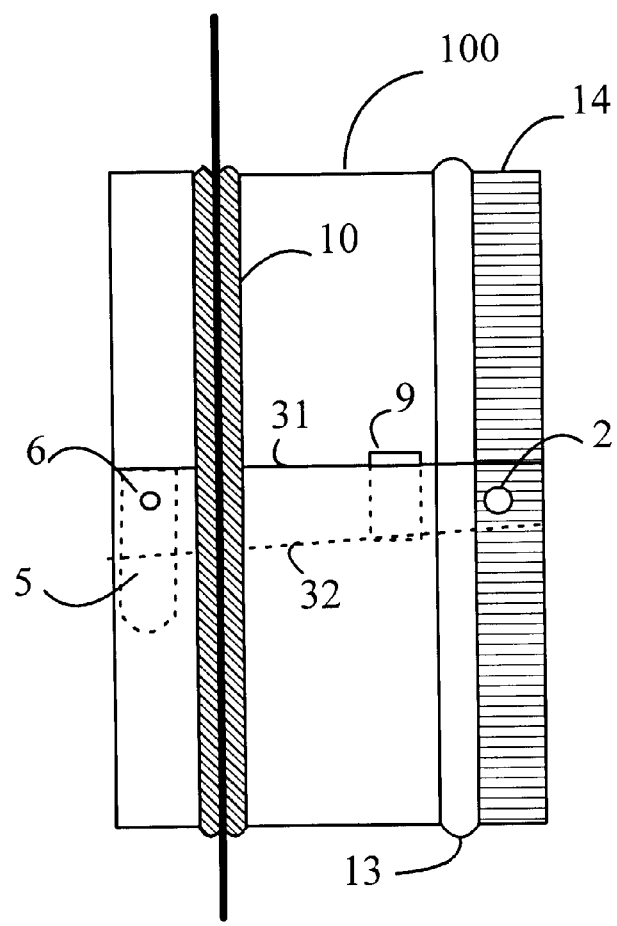
FIG. 7 is a side view of another embodiment of a collar according to the present invention.

Yet another embodiment of a locking mechanism is shown in FIGS. 6 and 7. FIG. 6 is an expanded end view of a portion of collar 1 showing another alternative locking mechanism. FIG. 7 is a side view of another embodiment of a collar according to the present invention that utilizes this clip mechanism. In this embodiment, a sliding clip 9 is utilized to expand the collar. The overlapping edges 31 and 32 of the collar are cut such that the edges are not parallel. The end of clip 9 is pushed along the tapered edges until the collar is fully expanded thereby locking the collar in the fully expanded configuration. This clip may be placed anywhere along the overlap provided it is close enough to the groove to assure a tight fit between the groove and the edge of the hole in the plenum. This clip arrangement may also be used to set the overlap at the end of the tube that engages the ducting.

Figure 8:
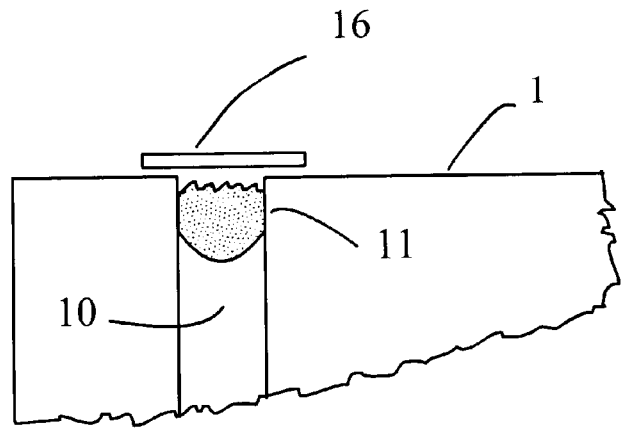
FIG. 8 is a cross-sectional view of a portion of collar 1 in the vicinity of groove 10.

In the preferred embodiment of the present invention, collar 1 is shipped with the caulking bead 11 already in place. Referring to FIG. 8, which is a cross-sectional view of a portion of collar 1 in the vicinity of groove 10, a cover layer 16 is provided to protect the caulking. Cover layer 16 is preferably a layer of adhesive tape that is removed just prior to the insertion of the collar into the hole.

Referring again to FIG. 7, which is a side view of another embodiment of a collar according to the present invention. Collar 100 differs from collar 1 in that a crimped region 14 is utilized to reduce the size of collar 100 in the region that accepts the ducting. Region 14 facilitates the attachment of the ducting The above described embodiments of the present invention have utilized a ridged area 13 that facilitates the attachment and sealing of the duct to the collar. However, it will be obvious to those skilled in the art from the preceding discussion that this ridge is optional.

In the preferred embodiment of the present invention, the collar is preferably fabricated from a rectangular sheet of galvanized steel of the type normally used in constructing plenums and the like. For convenience, the edges may be labeled as top, bottom, left and right. The various grooves, ridges and holes are preferably introduced by stamping and punching the sheet prior to the rolling operation. The groove and ridge are preferably parallel to the top and bottom edges. The sheet is then rolled such that the left and right edges overlap and the portion of the groove on the left edge overlaps the portion of the groove on the right edge.

The above-described embodiments of the present invention utilized two holes in the collar for engaging a separating tool to force the groove against the edges of the hole. However, it will be obvious to those skilled in the art from the preceding discussion that any form of detent or tab that can be separated either manually or with the aid of a tool can be utilized for this purpose.

Refer now to FIGS. 9–11, which illustrate another embodiment of a collar 200 according to the present invention. FIG. 9 is a side view of collar 200; FIG. 10 is an end view of a portion of collar 200 in the direction shown by arrow 220, and FIG. 11 is an end view of a portion of collar 200 in the direction shown by arrow 230. Collar 200 utilizes two simple cut-out tabs and a slot for providing setting the diameters of the two ends of the collar when the collar is engaged with the plenum wall 15 and the ducting. To simplify the following discussion and drawings, the ducting is not shown in the figures, and those items that serve the same finction as items discussed above with respect to FIG. 2 have been given the same numerical designations. In collar 200 the fastener 2 discussed above has been replaced by a tab 206 cut from end 202 of collar 200. Tab 206 engages a slot 205 in the overlapping end 201. The tab prevents this end of the collar from collapsing when the duct is inserted over ridge 13. The end of tab 206 may be bent backwards to fix the position of ends 201 and 202 with respect to one another. Similarly, the size of the end of the collar that engages the hole in the plenum wall is set by bending back a tab 217 that is punched from end 216 after the collar has been expanded by placing the expanding tool in holes 3 and 4 as discussed above. When the collar has been expanded, end 217 is bent back as shown in FIG. 11 thereby fixing the collar to the plenum wall.

The above-described embodiments of the present invention utilized caulking material to form the seal between the edges of the hole in the plenum wall and the groove in the collar thus providing a seal on both sides of the plenum wall. However, it will be obvious to those skilled in the art from the preceding discussion that any flexible sealing material can be utilized for this purpose. Furthermore, the groove may be created by any method. Refer now to FIG. 12, which is a cross-sectional view of a portion of a collar 300 according to another embodiment of the present invention. In collar 300, a grooved structure is created by stamping two ridges 301 and 302 separated by a small space into the sheet metal. In this case, the ridges from the walls of the "groove" are for holding the caulking material 303.

Various modifications to the present invention will become apparent to those skilled in the art from the foregoing description and accompanying drawings. Accordingly, the present invention is to be limited solely by the scope of the following claims.

What is claimed is:

1. A collar for connecting a duct to a wall having a hole therein bounded by an edge having a predetermined thickness, said collar comprising:

sheet of material having top, bottom, left and right edges, said sheet forming tubular structures when said left and right edges overlap, said sheet comprising a groove for engaging said edge of said hole, said groove being present when said collar is not engaged with said edge of said hole and said sheet further comprising first and second detents spaced apart on said sheet, said overlap of said left and right edges at said top edge changing when said spacing between said first and second detents is changed said groove being located proximate to said top edge;

a first fastener for fixing said overlap of said left and right edges at said top edge when said edge of said hole is engaged in said groove, said overlap being selectable from a plurality of overlap positions; and a second fastener for fixing said overlap of said left and right edges at said bottom edge.

2. The collar of claim 1 wherein said groove further comprises a layer of sealing material for forming a seal between said sheet of material and said edge of said hole.

3. The collar of claim 1 further comprising a removable cover strip over said groove for protecting said layer of sealing material.

4. The collar of claim 1 wherein said first and second detents comprise holes on said sheet.

5. The collar of claim 1 wherein said first fastener comprises a tab connected to said left edge that engages one of a plurality of holes near said right edge.

6. The collar of claim 1 wherein said first fastener comprises a tab connected to said left edge that is bent around said right edge when said groove is engaged with said edges of said hole.

7. The collar of claim 1 wherein said second fastener comprises a pin proximately located to said bottom edge of said sheet, said pin connecting said left and right edges of said sheet.

8. The collar of claim 1 wherein said sheet further comprises a ridge for forming a seal with said duct when said duct is installed over said collar.

9. The collar of claim 8 wherein said ridge is parallel to said bottom edge of said sheet.

* * * * *